United States Patent [19]

Nomi

[11] Patent Number: 4,692,369
[45] Date of Patent: Sep. 8, 1987

[54] WATER-VAPOR-PERMEABLE, WATERPROOF, HIGHLY ELASTIC FILMS

[75] Inventor: Haruo Nomi, Wake, Japan
[73] Assignee: Japan Gore-Tex, Inc., Japan
[21] Appl. No.: 806,702
[22] Filed: Dec. 9, 1985

[30] Foreign Application Priority Data

Dec. 11, 1984 [JP] Japan .............................. 59-259968

[51] Int. Cl.⁴ .............................................. B32B 3/26
[52] U.S. Cl. ................................. 428/198; 428/230; 428/290; 428/422; 428/910
[58] Field of Search ............... 428/422, 230, 231, 290, 428/198, 910

[56] References Cited

U.S. PATENT DOCUMENTS

| | | | |
|---|---|---|---|
| 3,953,566 | 4/1976 | Gore ................................... | 428/422 |
| 4,113,912 | 9/1978 | Okita .................................. | 428/422 |
| 4,194,041 | 3/1980 | Gore et al. .......................... | 428/422 |
| 4,443,511 | 4/1984 | Worden et al. ..................... | 428/422 |
| 4,539,256 | 9/1985 | Shipman ............................. | 428/315.5 |
| 4,613,544 | 9/1986 | Burleigh ............................. | 428/315.5 |

*Primary Examiner*—William J. Van Balen
*Attorney, Agent, or Firm*—Mortenson & Uebler

[57] ABSTRACT

A water-vapor-permeable, waterproof, highly elastic film of expanded, porous, unsintered polytetrafluoroethylene having impregnated within the pores of the porous film, on both sides thereof, a water-vapor-permeable resin, for example, an elastomer containing urethane bonds and a hydrophilic group(s) in its molecular structure. The film of this invention is useful in clothing, tents, and various applications where water vapor transmission characteristics and waterproofness are simultaneously desired. The film has elongation percentage in at least one direction exceeding 40% and durability in repeated stretching to 80% of its elongation percentage of more than 200,000 cycles.

4 Claims, 1 Drawing Figure

U.S. Patent  Sep. 8, 1987  4,692,369
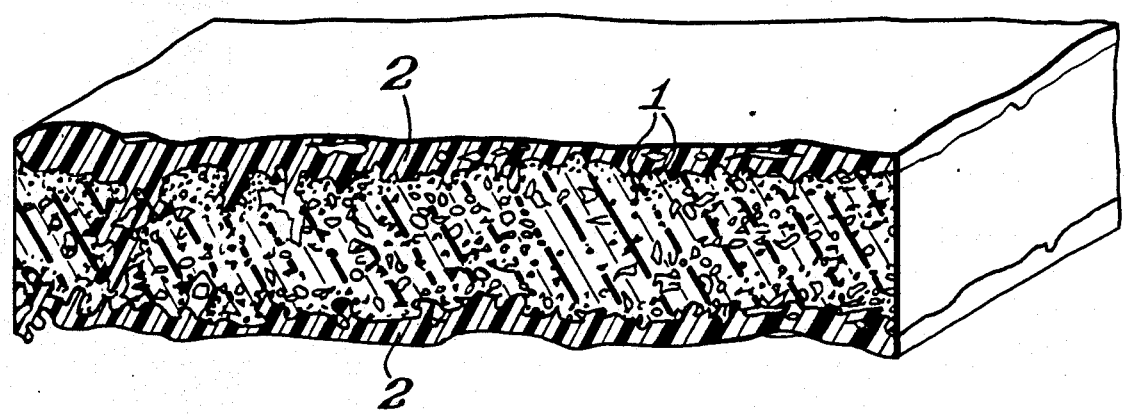

WATER-VAPOR-PERMEABLE, WATERPROOF, HIGHLY ELASTIC FILMS

BACKGROUND OF THE INVENTION

The present invention relates to elastic films having both water-vapor-permeability and waterproofness, and provides novel products having, simultaneously, water-vapor-permeable and waterproofness properties.

In various clothing apparel, tents and other articles, materials having waterproof characteristics and water-vapor-permeability have been put to practical use in recent years and have been utilized as comfortable outdoor wear and the like. However, many of these materials lack elasticity or are at most slightly elastic. Materials having high elasticity are known, but such known materials are generally poor in water-vapor-permeability and most are not substantially waterproof.

Materials having both waterproof and water-vapor-permeable properties are known, such as expanded porous materials of polytetrafluoroethylene (hereafter referred to as PTFE) disclosed in, for example, U.S. Pat. No. 3,953,566. This expanded PTFE is both highly porous and has high crystallinity. The highly stretched finished materials possess a high degree of fibrillation, as well as the aforesaid waterproofness and water-vapor-permeable properties.

For waterproof, water-vapor-permeable materials which lack elasticity as mentioned above, for example, in sporting apparel, those having a size large enough to ensure stretching of the wearer's body can be provided; on the other hand, apparel of such a large size becomes loose, and detracts from the beauty of the garments when they are worn. Particularly in sports requiring speed, wind resistance and the like increases and detracts from the usefulness of the garment. The above-mentioned, expanded PTFE materials are excellent in planar tensile strength, as a result of fibrillation to a high degree, but they possess poor strength in the thickness, or Z- direction. Particularly in unsintered, expanded PTFE, a peel-off phenomenon of the surface layer, which is called fracture, can occur. In order to avoid such a phenomenon, sintering may be required but sintered PTFE causes fusion between fibrils so that elasticity of the film becomes poor because of no lubrication between fibrils. Accordingly, even though such sintered, expanded PTFE can be used and laminated to other materials, elasticity of the partner laminate is inhibited by the aforesaid sintered PTFE, and substantial elasticity is not obtained for the laminate as a whole.

U.S. Pat. No. 4,443,511 provides a waterproof and breathable elastomeric polytetrafluoroethylene layered article for use in, for example, material for protective articles. The waterproof and breathable polytetrafluoroethylene layered article can for example, exhibit elastomeric properties of stretch to break of 275% in the machine direction, and 145% in the transverse direction and a total stretch recovery of at least 39% after being stretched to 75% extension for 100 cycles. That invention further provided a waterproof and breathable elastomeric polytetrafluoroethylene layered article bonded to a stretch fabric. The waterproof and breathable elastomeric polytetrafluoroethylene layered article bonded to a stretch fabric is durable and possesses a moisture vapor transmission rate exceeding 1000 gms/m$^2$ day, and preferably above the 2000 gms/m$^2$ day.

U.S. Pat. No. 4,194,041 discloses a waterproof and breathable polytetrafluoroethylene (PTFE) laminate that possesses a high moisture vapor transmission rate under adverse climatic conditions. Such laminates and modified forms thereof are commercially available from W. L. Gore & Associates, Inc. The waterproof and breathable laminate of U.S. Pat. No. 4,194,041 comprises a flexible first layer of a microporous hydrophobic material having a moisture vapor transmission rate exceeding 1000 gms/m$^2$ day, an advancing water contact angle exceeding 90 degrees and a second layer of continuous hydrophilic elastomeric material attached to the inner face of the first layer whereby the second layer has a moisture vapor transmission rate exceeding 1000 gms/m$^2$ day and does not permit the detectable passage of liquid water therethrough at hydrostatic pressures of about 24 cm water head and about 172 KN/m$^2$ for 30 seconds.

The porous membrane of expanded polytetrafluoroethylene (PTFE) used in the above laminate can be provided by following the techniques of U.S. Pat. No. 3,953,566. Such membranes and modified forms thereof are commercially available under the registered trademark GORE-TEX ®, sold by W. L. Gore & Associates, Inc. These expanded, porous PTFE membranes satisfy the requirements of being waterproof while also being permeable to the flow of water vapor. The expanded porous PTFE membranes are inherently hydrophobic and contain very small pores that resist the entry of liquid water even at substantial pressures or when rubbed or flexed, but readily allow the flow of gases including water vapor. Unlike wicking materials breathability is achieved by evaporation of liquid water inside the garment or on the inner surface of the membrane followed by gaseous flow or diffusion of water vapor through the membrane to the outside. The teachings of that patent are incorporated herein by reference.

U.S. patent application Ser. No. 443,139, filed Nov. 19, 1982, now abandoned describes a waterproof and breathable elastomeric polytetrafluoroethylene layered article for use in, for example, material for footwear articles. The waterproof and breathable polytetrafluoroethylene layered article can, for example, exhibit elastomeric properties of stretch to break of 275% in the machine direction, and 145% in the transverse direction and a total stretch recovery of at least 39% after being stretched to 75% extension for 100 cycles.

U.S. patent application Ser. No. 603,186, filed Apr. 23, 1984 discloses certain polyurethanes impregnated to an extent into expanded, unsintered PTFE sheets.

SUMMARY OF THE INVENTION

A water-vapor-permeable, gas impermeable, liquid waterproof, highly elastic composite film is provided comprising a film of expanded, porous, unsintered polytetrafluoroethylene having impregnated within its pores, on both sides of the film, a water-vapor-permeable polymeric resin, the film having elongation percentage in at least one direction exceeding 40% and durability in repeated stretching to 80% of its elongation percentage of more than 200,000 cycles. The water-vapor-permeable resin is preferably an elastomer containing urethane bonds and a hydrophilic group in its molecular structure.

BRIEF DESCRIPTION OF THE DRAWINGS

The drawing shows schematically an enlarged cross-sectional view of a composite film of the present invention, at about a magnification of 2000 ×.

DETAILED DESCRIPTION OF THE INVENTION AND PREFERRED EMBODIMENTS WITH REFERENCE TO THE DRAWINGS

A water-vapor-permeable, waterproof, highly elastic film of expanded, porous, unsintered polytetrafluoroethylene having impregnated within the pores of the porous film, on both sides thereof, a water-vapor-permeable resin, for example, an elastomer containing urethane bonds and a hydrophilic group(s) in its molecular structure. The film of this invention is useful in clothing, tents, and various applications where water vapor transmission characteristics and waterproofness are simultaneously desired. The film has elongation percentage in at least one direction exceeding 40% and durability in repeated stretching to 80% of its elongation percentage of more than 200,000 cycles.

The present invention will be explained in detail with reference to the drawing. According to the present invention, and elastomeric resin 2 having water-vapor-permeability is impregnated into the pores on both sides of an expanded, unsintered porous film of PTFE 1 and retained thereon after curing. The structure of this expanded porous film of PTFE and elastomer composite is such that an indefinite number of fine fibers are interconnected in a web between a number of nodes at the planar surfaces. The composites have pore sizes of less than 1 $\mu$m, preferably 0.01 $\mu$m, provided by the spaces between these fine fibers, a satisfactory waterproofness property is provided and, in addition, water-vapor-permeability by diffusion is provided through the spaces. The composite is water-vapor-permeable by diffusion but is substantially gas-impermeable.

The water-vapor-permeable composite comprising the elastic resin impregnated in and retained on the expanded porous PTFE film is as shown in the drawing, in which resin coating layer 2 is formed on the upper and lower surfaces of fine fiber layer 1 of expanded PTFE.

The film of the present invention as described above may be laminated onto elastic fabrics or knits, including, for example, Spandex ® elastic fiber.

It is important to this invention that the expanded, film of PTFE described above be unsintered. The expanded material of unsintered PTFE exhibits stretch elongation by a relatively small stress due to insufficient fusion between the fine fibrils, but does not possess significant elastic stretch recovery by itself. In addition, due to an extremely weak aggregation force in the thickness or Z- direction, the peel-off phenomenon can occur at the surface layer, as mentioned hereinabove. These disadvantages are effectively overcome by the aforesaid elastomeric resin coating layer 2. Namely, a high degree of elastic recovery is exhibited and the peel-off phenomenon at the surface layer can be substantially avoided. As the coating materials for such waterproof, water-vapor-permeable resins, elastomeric resins containing urethane bonds and a hydrophilic group(s) in the molecule thereof, and prepolymers thereof, and polyamino acids and the like may be mentioned.

Examples in accordance with the present invention are presented together with comparative examples below.

PREPARATION EXAMPLE 1

In a stainless container were charged 100 parts by weight of water-vapor-permeable urethane resin (made by Dai-Nippon Ink Chemical Industry Co., Ltd., Krisbon #3314), 10 parts by weight of polyisocyanate (made by Dai-Nippon Ink Chemical Co., Ltd., Krisbon NX), 3 parts by weight of a catalyst (made by Dai-Nippon Ink Chemical Co., Ltd., Krisbon HM), and 20 parts by weight of toluene as a solvent. The mixture was thoroughly mixed and dissolved with a TK Homomixer. Then the solution was filtered with a stainless steel screen of 200 mesh to obtain a coating solution. A film composed of unsintered, expanded PTFE, and having a porosity of 80%, a mean pore diameter of 0.2 $\mu$m and a mean thickness of 30 $\mu$m was immersed in the coating solution described above, whereby the coating solution was completely impregnated and soaked into the film. Further, squeezing was performed using a mangle to squeeze the unnecessary coating solution away. The composite film was fixed on a frame to prevent shrinkage. After drying at 100° C. for 1 minute, heat treatment was carried out at 120° C. for 2 minutes.

This composite was laminated by point-by-point adhesion with a total adhesion area coverage of 40% on a two-way stretched fabric having a stretch ratio of 55% (in the vertical direction) and 55% (in the horizontal direction) which was composed of 18 denier nylon and 30 denier Spandex ®.

COMPARATIVE EXAMPLE 1

As Comparative Example 1, a composite was prepared from sintered, expanded PTFE film having the same porosity, mean pore diameter and mean thickness of the above-mentioned unsintered, expanded PTFE film, using the same coating solution, the same finishing process and the same two-way stretched fabric, under the same processing conditions.

COMPARATIVE EXAMPLE 2

Further, as Comparative Example 2, a composite was prepared of the unsintered, expanded PTFE film used in Preparation Example 1, but without immersing the water-vapor-permeable urethane resin therein, on the same two-way stretched fabric as that of Preparation Example 1 under the same laminate conditions as in Preparation Example 1.

PREPARATION EXAMPLE 2

A mixture of diphenylmethane-4,4'-diisocyanate (MDI), polyethylene glycol having a molecular weight of 1500 and 1,4-butanediol in a molar ratio of 6:3:2 was reacted at 90° C. for about 15 hours in a nitrogen flow to polymerize. The polymer was a light yellow solid at room temperature (23° C.). Further, the polymer was dissolved in a solution mixture of dimethyl formamide and xylene in a weight ratio of 2:8 in a solid content of 30%. MDI was further additionally dissolved in a ratio of 3 g per 100 g of the polymer to obtain a coating solution. The same unsintered PTFE film as used in Preparation Example 1 was immersed in the above-mentioned coating solution to completely impregnate the film with the solution. After removing an excess of the coating solution by squeezing with a mangle, the film was mounted on a frame to prevent shrinkage. Dry heating at 120° C. for 2 minutes was performed and then wet heating followed at 100° C. for 3 minutes to obtain the unsintered, expanded PTFE impregnated with a water-vapor-permeable high molecular weight substance. Using this film, a two-way stretch fabric having an expansion ratio of 60% (in the vertical direction) and 55% (in the horizontal direction) composed of 60 denier nylon and 70 denier Spandex ® was point-by-point adhered with an adhesive area coverage of 40% to obtain a composite of the film and fabric.

With each of the films obtained in Preparation Examples 1 and 2 and Comparative Examples 1 and 2, water-vapor-permeability, 100% modulus, break elongation, break strength and thermal contraction percentage were measured and, with respect to the composite, water-vapor-permeability, elasticity, durability in repeated elongation and water proofness were measured. The results are shown in Tables 1 and 2, respectively.

$$\text{Water vapor permeability} = \frac{(W_2 - W_1)}{A \times T} \times 24 \ [g/m^2 \cdot day]$$

(wherein A is an area of the opening of the water vapor cup.)

*2, *3 and *4: Measurement of 100% modulus, breaking elongation, and breaking strength at a tensile rate of 200 mm/min at room temperature of 23° C.

*5: Thermal contraction percentage.

A specimen was cut into about a 25 cm square. After marking the specimen by a 10 cm line at the vertical and horizontal directions, the specimen was aged at 120° C. for 2 hours with a gear aging tester. After cooling to room temperature, the space between the marking lines

TABLE 1

| Characteristic of Film | Example 1 unsintered film impregnated with coating solution 1 | Comparative Example 1 sintered film impregnated with coating solution 1 | Comparative Example 2 unsintered film impregnated with no coating solution | Example 2 unsintered film impregnated with coating solution 2 |
|---|---|---|---|---|
| *1 Water Vapor Permeability | 40,000 g/m² day | 40,000 g/m² day | 120,000 g/m² day | 60,000 g/m² day |
| *2 100% Modulus | v: 648 kg/cm² h: 160.0 kg/cm² | v: 88.5 kg/cm² h: 215.6 kg/cm² | v: 50.3 kg/cm² h: 103.1 kg/cm² | v: 100.4 kg/cm² h: 106.8 kg/cm² |
| *3 Breaking Elongation | v: 188% h: 90% | v: 241% h: 99% | v: 260% h: 220% | v: 178% h: 160% |
| *4 Breaking Strength | v: 89.2 kg/cm² h: 136.4 kg/cm² | v: 168.0 kg/cm² h: 217.6 kg/cm² | v: 90.6 kg/cm² h: 113.2 kg/cm² | v: 130.4 kg/cm² h: 120.0 kg/cm² |
| *5 Thermal Contraction Percentage | v: 3.0% h: 2.1% | v: 2.0% h: 2.0% | v: 55% h: 40% | v: 3.0% h: 2.0% | v: vertical direction
h: horizontal direction

TABLE 2

|  | Example 1 | Comparative Example 1 | Comparative Example 2 | Example 2 |
|---|---|---|---|---|
| Water Vapor Permeability | 20,000 g/m² day | 21,000 g/m² day | 30,000 g/m² day | 24,000 g/m² day |
| *6 Elongation Percentage | v: 44% h: 50% | v: 22% h: 10% | v: 48% h: 49% | v: 43% h: 40% |
| *7 Durability in Repeated Elongation | more than 200,000 times | more than 200,000 times | broken at 100 times | more than 200,000 times |
| *8 Water Proof | more than 5.0 kg/cm² | more than 5.0 kg/cm² | more than 5.0 kg/cm² | more than 5.0 kg/cm² | v: vertical direction
h: horizontal direction

*1 to *8 in Tables 1 and 2 indicate the following:

*1: Method for measurement of water-vapor-permeability.

A hygroscopic agent (a persaturated aqueous solution of potassium acetate) was charged in a water vapor cup to reach about ⅔ of the cup content and the opening of the cup was sealed watertight with paraffin by an expanded porous PTFE film. After the weight ($W_1$) of the cup was measured to a 1 mg unit, the container was turned upside down in a water tank kept at a constant temperature (23° C.). After a determined time period (T) passed, the specimen was withdrawn and then the weight ($W_2$) of the water vapor cup was measured. The water-vapor-permeability is calculated according to the following equation.

was measured.

*6: Elongation percentage.

It was measured in accordance with the HIS L 1096 constant force method.

*7: Durability in repeated elongation.

A specimen was mounted on a device in which the specimen could be stretched to 80% of the elongation percentage measured in *6 and a cycle of elongation (80% elongation) and relaxation (0% elongation) was repeated. At every 100 cycles, the specimen was withdrawn and water pressure of 0.2 kg/cm² was applied thereto for 2 minutes to observe water leakage and appearance. A point of time when the water leakage or poor appearance occurred was made an endpoint.

*8: Waterproof property.

Water pressure when leakage of water started was measured using a waterproofing tester of the Mullen type.

That is, as is clear from Tables 1 and 2 described above, the expandable laminate obtained in accordance with the present invention possessed a high waterproofness and at the same time possessed high water-vapor-permeability. Further, the laminate can be stretched by a relatively small stress and is excellent in durability of expansion. It has been thus confirmed that the laminate is extremely useful.

According to the present invention as described above, materials having waterproofness and moisture-vapor-permeability and also having excellent elastic stretching characteristics can be provided. The material does not allow penetration of rain, effectively discharges moisture vapor caused by sweating and has elastomeric stretch properties. Accordingly, the material can provide comfortable wear for skiing or golfing apparel and also provide stylish, closely fitted products.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A water-vapor-permeable, gas impermeable, liquid waterproof, highly elastic composite film comprising a film of expanded, porous, unsintered polytetrafluoroethylene having completely impregnated within its pores a water-vapor-permeable polymeric resin, said composite film having elongation percentage in at least one direction exceeding 40% and durability in repeated stretching to 80% of its elongation percentage of more than 200,000 cycles.

2. The composite film of claim 1 wherein said water-vapor-permeable resin is an elastomer containing urethane bonds and a hydrophilic group in its molecular structure.

3. The composite film of claim 1 laminated to a two-way stretch fabric.

4. The composite film of claim 1 laminated to a two-way stretch fabric by a point-to-point adhesive wherein the total adhesion area coverage is about 40%.

* * * * *

UNITED STATES PATENT AND TRADEMARK OFFICE
CERTIFICATE OF CORRECTION

PATENT NO. : 4,692,369

DATED : September 8, 1987

INVENTOR(S) : Haruo Nomi

It is certified that error appears in the above-identified patent and that said Letters Patent is hereby corrected as shown below:

In column 5, TABLE 1, line 10, "v: 648 kg/cm$^2$" should read —v: 64.8 kg/cm$^2$—

Signed and Sealed this

Twenty-sixth Day of April, 1988

Attest:

DONALD J. QUIGG

*Attesting Officer*     *Commissioner of Patents and Trademarks*